United States Patent
Shih et al.

(10) Patent No.: US 9,222,639 B2
(45) Date of Patent: Dec. 29, 2015

(54) VEHICLE COMPOSITE REFLECTION AND REFRACTION MULTI-IMAGING DEVICE

(75) Inventors: Ming-Jhih Shih, Tainan (TW); Jin-Hua Wu, Tainan (TW)

(73) Assignee: TYC Brother Industrial Co., Ltd., Tainan (TW)

( * ) Notice: Subject to any disclaimer, the term of this patent is extended or adjusted under 35 U.S.C. 154(b) by 250 days.

(21) Appl. No.: 13/603,182

(22) Filed: Sep. 4, 2012

(65) Prior Publication Data

US 2014/0029106 A1 Jan. 30, 2014

(30) Foreign Application Priority Data

Jul. 27, 2012 (TW) .............................. 101127321 A

(51) Int. Cl.
*F21S 8/10* (2006.01)
*B60R 1/12* (2006.01)
*B60Q 3/02* (2006.01)

(52) U.S. Cl.
CPC ............. *F21S 48/234* (2013.01); *F21S 48/238* (2013.01); *F21S 48/24* (2013.01); *B60Q 3/0213* (2013.01); *B60R 2001/1215* (2013.01); *F21S 48/215* (2013.01)

(58) Field of Classification Search
CPC ..... F21S 48/234; F21S 48/24; F21S 48/1225; F21S 48/1388; F21S 48/13; F21S 48/215; F21S 8/10; F21S 48/1283; F21S 48/2281; G02B 2027/0118; G02B 27/0101; G02B 17/02; G02B 17/08; G02B 27/22; G02B 17/0856; G02F 1/133605

USPC ......... 359/838, 515, 872, 267, 633, 602, 726, 359/727, 876; 362/487, 516

See application file for complete search history.

(56) References Cited

U.S. PATENT DOCUMENTS

| | | | | |
|---|---|---|---|---|
| 5,037,182 A | * | 8/1991 | Groves et al. | 359/630 |
| 5,760,931 A | * | 6/1998 | Saburi | G02B 27/0101 345/7 |
| 6,075,651 A | * | 6/2000 | Hoppe | 359/641 |
| 6,084,842 A | * | 7/2000 | Miura | G11B 7/1362 369/112.19 |
| 2005/0078486 A1 | * | 4/2005 | Kawaguchi | 362/494 |
| 2008/0094842 A1 | | 4/2008 | King et al. | |
| 2011/0149585 A1 | * | 6/2011 | Dubosc | 362/519 |
| 2011/0280039 A1 | * | 11/2011 | Kishimoto | B60Q 1/0011 362/554 |

* cited by examiner

*Primary Examiner* — Ricky Mack
*Assistant Examiner* — Daniele Manikeu
(74) *Attorney, Agent, or Firm* — WPAT, P.C.; Anthony King

(57) ABSTRACT

The present invention relates to a vehicle composite reflection and refraction multi-imaging device including a reflecting surface, a semi-reflecting surface, and a concave lens. At least one image of at least one light source is reflected repeatedly by the semi-reflecting surface and the reflecting surface to form a plurality of visible mirror images on a mirror image side of the reflecting surface. The concave lens is disposed at the viewing side. A viewer at the viewing side views a plurality of visible mirror images at the mirror image side of the reflecting surface through the refracting of the concave lens. The reflected and refracted visible mirror images gradually shrink towards a vertical axis. Visible mirror images do not interfere with one another, and each visible mirror image is clear. The visible mirror images can generate an apparent inward-shrinking 3D effect of depth with levels.

10 Claims, 5 Drawing Sheets

VEHICLE COMPOSITE REFLECTION AND REFRACTION MULTI-IMAGING DEVICE

BACKGROUND OF THE INVENTION

1. Field of the Invention

The present invention relates to a vehicle multi-imaging device, and particularly to a vehicle composite reflection and refraction multi-imaging device.

2. Description of the Related Art

Referring to FIG. 1A, it shows a schematic view of a conventional vehicle imaging device. The conventional vehicle imaging device 10 includes: a reflecting surface 11. At least one light source 13 and 14 are disposed on a periphery of the reflecting surface 11 respectively. The reflecting surface 11 faces a viewing side S1.

Referring to FIG. 1B, it shows a schematic view of viewing a conventional vehicle imaging device from a viewing side. A viewer can only view a light-point image of at least one light source 13 and 14 at the viewing side S1, and the conventional vehicle imaging device cannot produce a three-dimensional (3D) effect of depth.

SUMMARY OF THE INVENTION

The present invention provides a vehicle composite reflection and refraction multi-imaging device including a reflecting surface, a semi-reflecting surface, and a concave lens. The reflecting surface faces a viewing side. The semi-reflecting surface faces the reflecting surface. At least one image of at least one light source is reflected by the semi-reflecting surface to form at least one mirror image on a mirror image side of the semi-reflecting surface. The at least one mirror image is then reflected by the reflecting surface to form at least one visible mirror image on a mirror image side of the reflecting surface. Each visible mirror image may undergo the reflecting repeatedly to produce a plurality of visible mirror images. The concave lens is disposed at the viewing side. A viewer at the viewing side views a plurality of visible mirror images at the mirror image side of the reflecting surface through the refracting of the concave lens.

By using the vehicle composite reflection and refraction multi-imaging device of the present invention, a viewer at a viewing side can view the reflected and refracted visible mirror images of at least one light source. The visible mirror images of the at least one light source gradually shrink towards a vertical axis. The visible mirror images of the at least one light source do not interfere with one another, and each visible mirror image is clear. The visible mirror images can generate an apparent inward-shrinking 3D effect of depth with levels.

DETAILED DESCRIPTION OF THE INVENTION

Figure 1A:
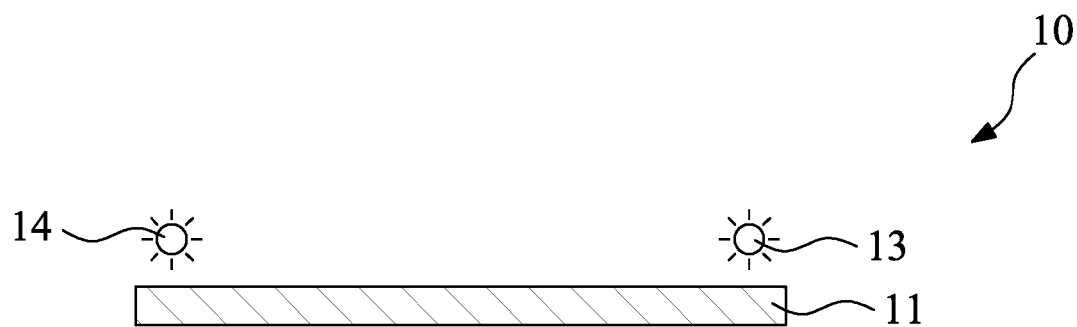
FIG. 1A shows a schematic view of a conventional vehicle imaging device.
Figure 1B:
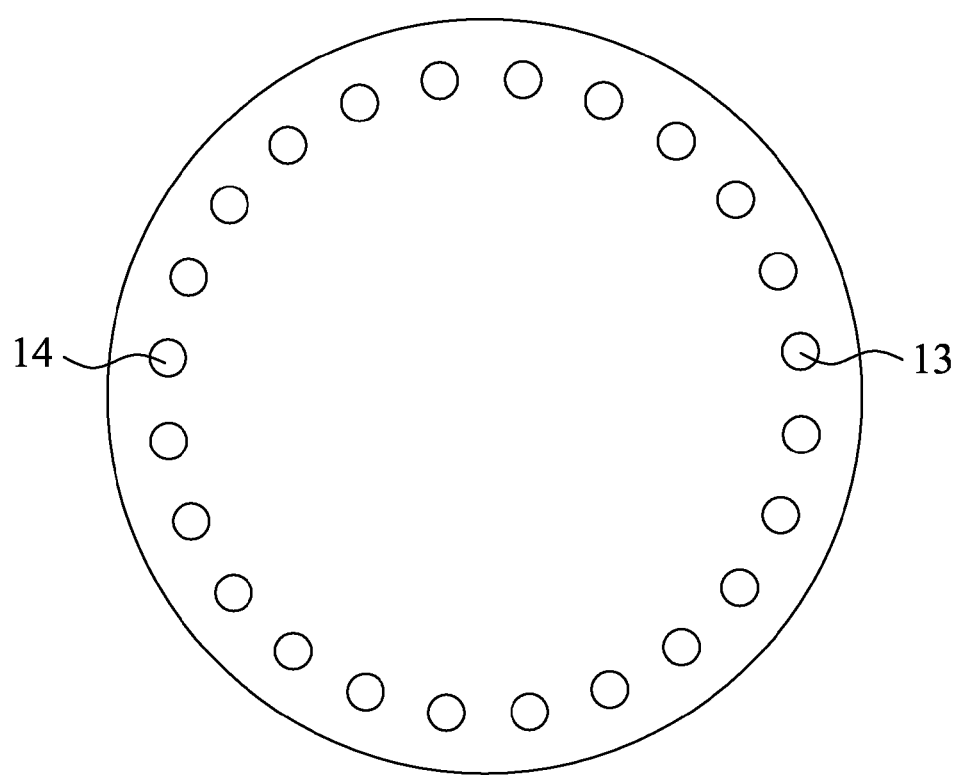
FIG. 1B shows a schematic view of viewing a conventional vehicle imaging device from a viewing side.
Figure 2:
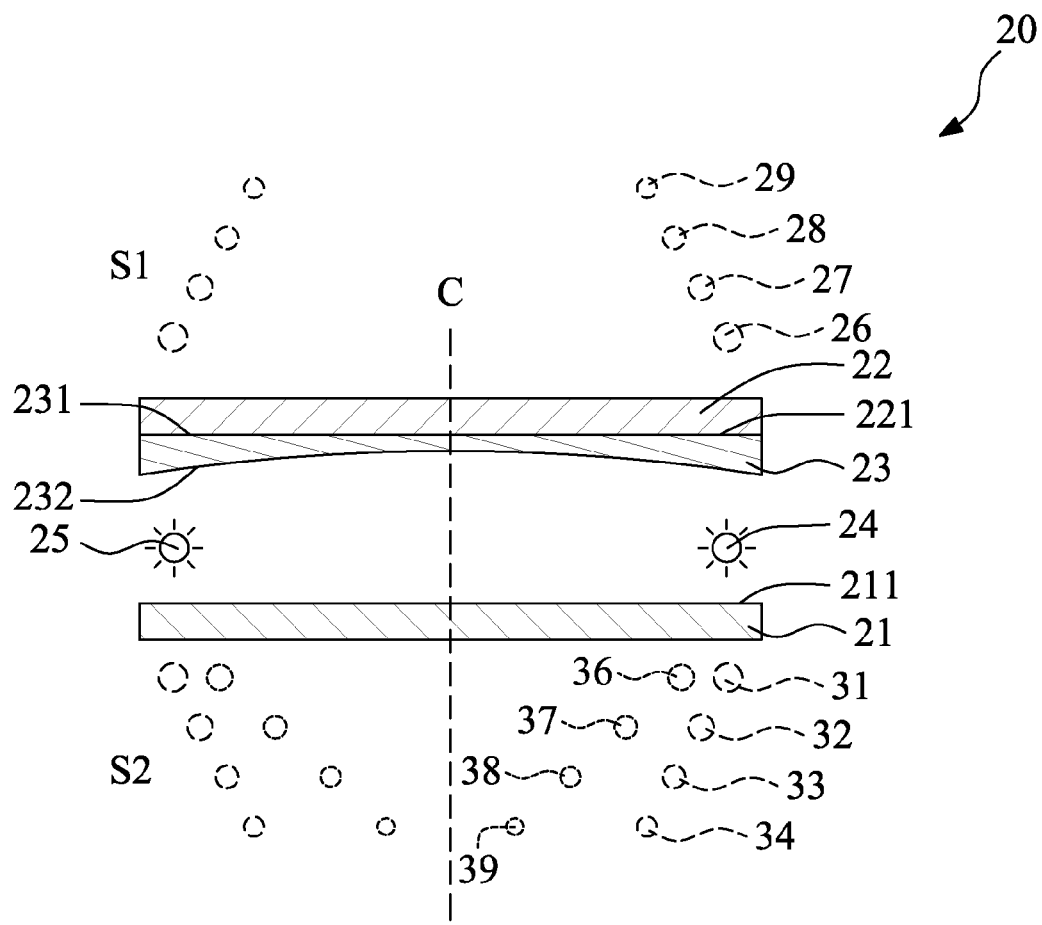
FIG. 2 shows a schematic view of a vehicle composite reflection and refraction multi-imaging device according to a first embodiment of the present invention.

Referring to FIG. 2, it shows a schematic view of a vehicle composite reflection and refraction multi-imaging device according to a first embodiment of the present invention. According to the first embodiment of the present invention, the vehicle composite reflection and refraction multi-imaging device 20 includes: a reflecting surface 21, a semi-reflecting surface 22, and a concave lens 23. The reflecting surface 21 faces a viewing side S1. The semi-reflecting surface 22 faces the reflecting surface 21. The concave lens 23 is disposed at the viewing side S1. Preferably, the concave lens 23 is disposed between the semi-reflecting surface 22 and the reflecting surface 21.

In this embodiment, at least one light source 24 and 25 are disposed between the concave lens 23 and the reflecting surface 21, the reflecting surface 21 is a flat reflecting surface, and the semi-reflecting surface 22 is a flat semi-reflecting surface. The concave lens 23 has a first surface 231 and a second surface 232. The first surface 231 is a flat surface. The second surface 232 is a concave surface. The first surface 231 contacts the semi-reflecting surface 22. There is a distance between the second surface 232 and the reflecting surface 21.

At least one image of the at least one light source 24 and 25 is reflected by the semi-reflecting surface 22 to form at least one mirror image 26, 27, 28 and 29 on a mirror image side of the semi-reflecting surface 22. In this embodiment, the mirror image side of the semi-reflecting surface 22 is the viewing side S1. The at least one mirror image 26, 27, 28 and 29 are then reflected by the reflecting surface 21 to form at least one visible mirror image 31, 32, 33 and 34 on a mirror image side S2 of the reflecting surface 21. The mirror image side S2 is opposite to the viewing side S1. Each visible mirror image undergoes the above reflection repeatedly, so as to produce a plurality of visible mirror images 31, 32, 33 and 34.

In this embodiment, the concave lens 23 is disposed between the semi-reflecting surface 22 and the reflecting surface 21. In addition to undergoing the aforementioned reflection, the image of the at least one light source 24 and 25 can undergo first refraction stage through the concave lens 23, so as to produce a plurality of visible mirror images 31, 32, 33 and 34 gradually shrinking towards a center. That is, the reflecting surface 21 has a vertical axis C, which is perpendicular to the reflecting surface 21, and the visible mirror images 31, 32, 33 and 34 of the at least one light source are refracted and shrink gradually towards a direction of the vertical axis C, and are formed at the mirror image side S2 of the reflecting surface 21.

In this embodiment, the first refraction stage of the concave lens 23 and the semi-reflecting surface 22 refers to a first refracting effect stage, and does not limit that refraction can only be performed once. That is, in the first refraction stage, by using the concave lens 23 and the semi-reflecting surface 22, the image of the at least one light source 24 and 25 undergoes a plurality of times of refracting and reflecting, and shrinks gradually, so as to form a plurality of the visible mirror images 31, 32, 33 and 34 of the at least one light source 24 and 25 at the mirror image side S2 of the reflecting surface 21.

However, a viewer does not view the visible mirror images 31, 32, 33 and 34 of the at least one light source through the first refraction stage at the viewing side S1. The reason is that the viewer at the viewing side S1 is required to use the concave lens 23 again to view the visible mirror image at the mirror image side S2 of the reflecting surface 21. Therefore, the viewer at the viewing side S1 views, through second refraction stage of the concave lens 23, at least one visible mirror image 36, 37, 38 and 39 of the at least one light source at the mirror image side S2 of the reflecting surface 21.

Similarly, the visible mirror images 36, 37, 38 and 39 of the at least one light source of the second refraction stage are refracted and shrink towards the vertical axis C, and are formed at the mirror image side S2 of the reflecting surface 21. Furthermore, the second refraction stage of the concave lens 23 refers to a second refracting effect stage, and does not limit that refraction can only be performed once. That is, in the second refraction stage, by using the concave lens 23 again, the visible mirror images 31, 32, 33 and 34 of the at least one light source in the first refraction stage undergo a plurality of times of refraction, and shrink gradually, so as to form a plurality of the visible mirror images 36, 37, 38 and 39 of the at least one light source at the mirror image side S2 of the reflecting surface 21.

Figure 3:
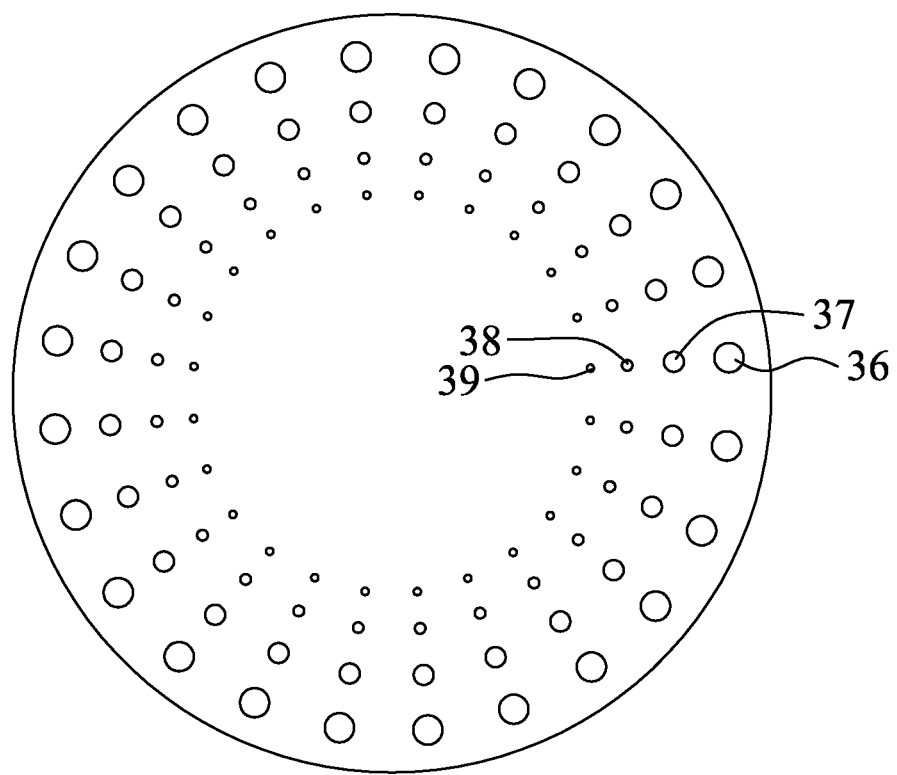
FIG. 3 shows a schematic view of viewing the vehicle composite reflection and refraction multi-imaging device of the first embodiment of the present invention from a viewing side.

Referring to FIG. 3, it shows a schematic view of viewing the vehicle composite reflection and refraction multi-imaging device of the first embodiment of the present invention from a viewing side. The viewer at the viewing side S1 can view the visible mirror image 36, 37, 38 and 39 of the at least one light source through the first and second refraction stage to be shrunk. The visible mirror images 36, 37, 38 and 39 of the at least one light source do not interfere with one another, and each visible mirror image is clear. The visible mirror images can generate an apparent inward-shrinking 3D effect of depth with levels.

Furthermore, in the vehicle composite reflection and refraction multi-imaging device of the present invention, a two-stage refracting effect can be achieved by using only the semi-reflecting surface 22 and the concave lens 23, so as to save the need of any additional device and effectively decrease the distance between the concave lens 23 and the reflecting surface 21, thereby reducing the overall size of the vehicle composite reflection and refraction multi-imaging device of the present invention.

Figure 4:
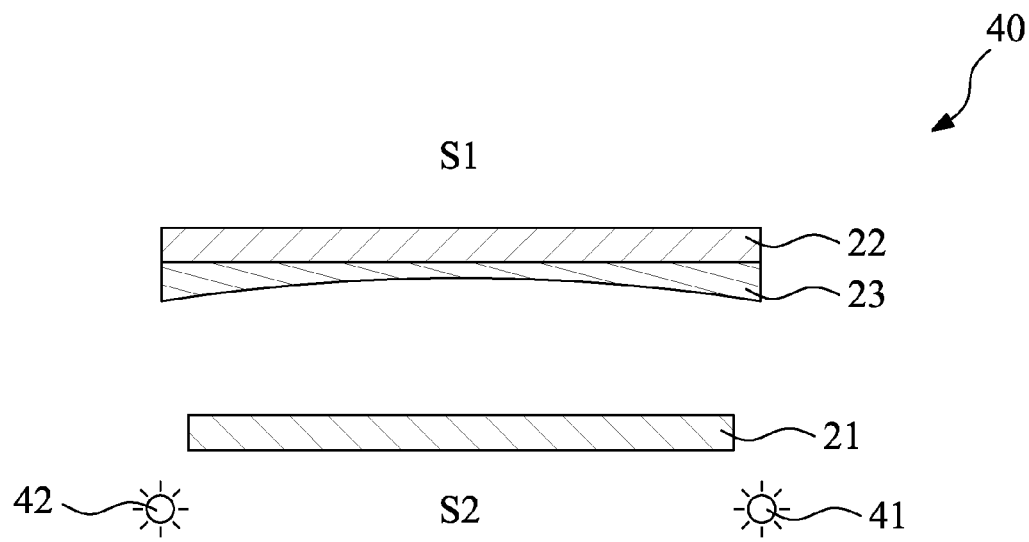
FIG. 4 shows a schematic view of a vehicle composite reflection and refraction multi-imaging device according to a second embodiment of the present invention.

Referring to FIG. 4, it shows a schematic view of a vehicle composite reflection and refraction multi-imaging device according to a second embodiment of the present invention. Differences between a vehicle composite reflection and refraction multi-imaging device 40 according to the second embodiment of the present invention and the vehicle composite reflection and refraction multi-imaging device 20 according to the first embodiment are as follows. At least one light source 41 and 42 are disposed behind a periphery of the reflecting surface 21, that is, disposed at the mirror image side S2 of the reflecting surface 21, so that at least one image of the at least one light source 41 and 42 can be reflected and refracted by the reflecting surface 21, the semi-reflecting surface 22 and the concave lens 23 to form a plurality of visible mirror images of the at least one light source at the mirror image side of the reflecting surface. Similarly, the vehicle composite reflection and refraction multi-imaging device 40 according to the second embodiment of the present invention has the aforementioned composite reflection and refraction effect.

Figure 5:
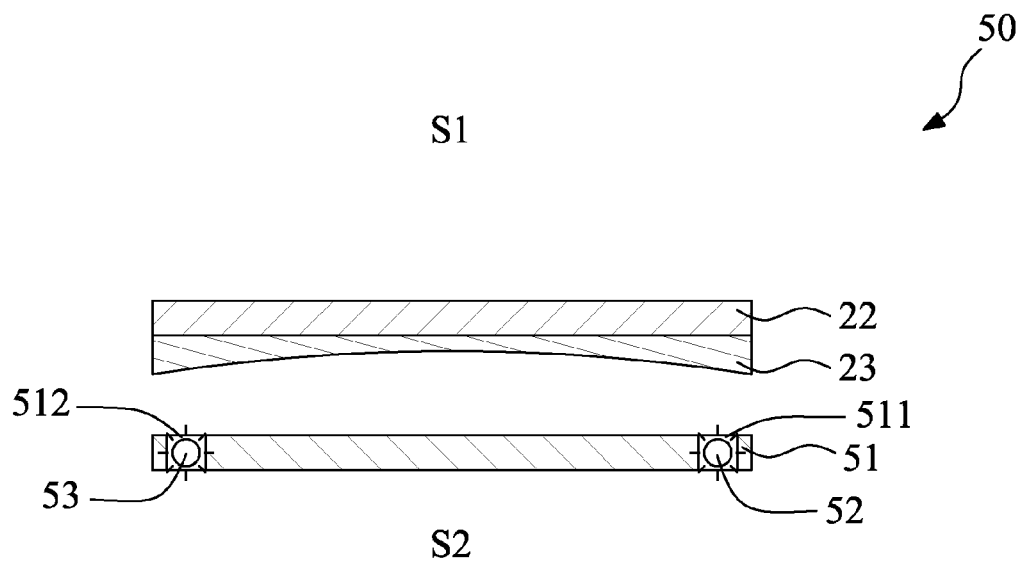
FIG. 5 shows a schematic view of a vehicle composite reflection and refraction multi-imaging device according to a third embodiment of the present invention.

Referring to FIG. 5, it shows a schematic view of a vehicle composite reflection and refraction multi-imaging device according to a third embodiment of the present invention. Differences between a vehicle composite reflection and refraction multi-imaging device 50 according to the third embodiment of the present invention and the vehicle composite reflection and refraction multi-imaging device 20 according to the first embodiment are as follows. A periphery of a reflecting surface 51 includes at least one hole 511 and 512, so as to receive at least one light source 52 and 53. The at least one light source 52 and 53 are disposed at the hole 511 and 512 of the periphery of the reflecting surface 51, so as to reduce the distance between the concave lens 23 and the reflecting surface 51, thereby further decreasing the overall size of the vehicle composite reflection and refraction multi-imaging device of the present invention. Similarly, the vehicle composite reflection and refraction multi-imaging device 50 according to the third embodiment of the present invention has the aforementioned composite reflection and refraction effect.

Figure 6:
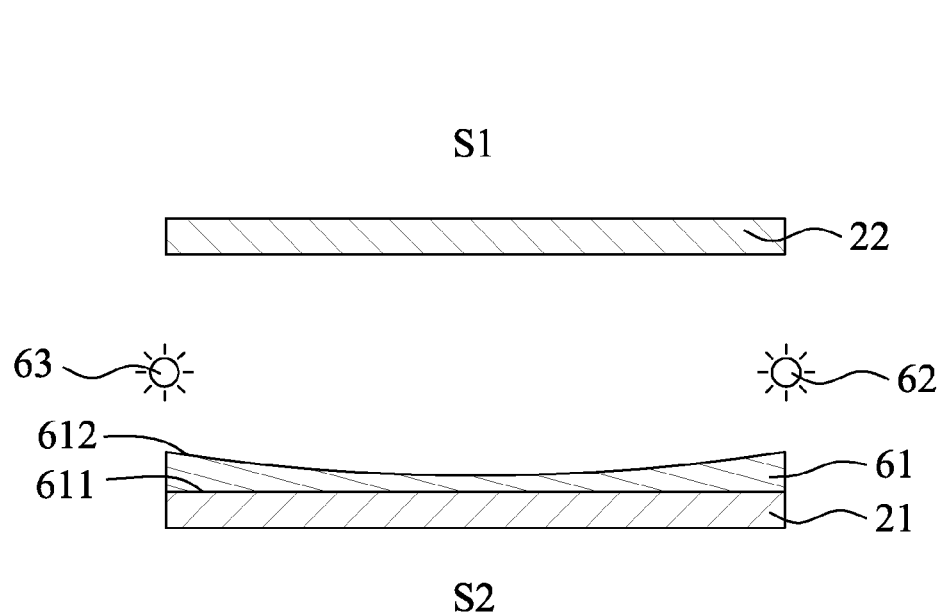
FIG. 6 shows a schematic view of a vehicle composite reflection and refraction multi-imaging device according to a fourth embodiment of the present invention.

Referring to FIG. 6, it shows a schematic view of a vehicle composite reflection and refraction multi-imaging device according to a fourth embodiment of the present invention. Differences between a vehicle composite reflection and refraction multi-imaging device 60 according to the fourth embodiment of the present invention and the vehicle composite reflection and refraction multi-imaging device 20 according to the first embodiment are as follows. The concave lens 61 has a first surface 611 and a second surface 612. The first surface 611 is a flat surface. The second surface 612 is a concave surface. The first surface 611 is disposed at the reflecting surface 21. There is a distance between the second surface 612 and the semi-reflecting surface 22. At least one light source 62 and 63 is disposed between the concave lens 61 and the semi-reflecting surface 22. Similarly, the vehicle composite reflection and refraction multi-imaging device 60 according to the fourth embodiment of the present invention has the aforementioned composite reflection and refraction effect.

Figure 7:
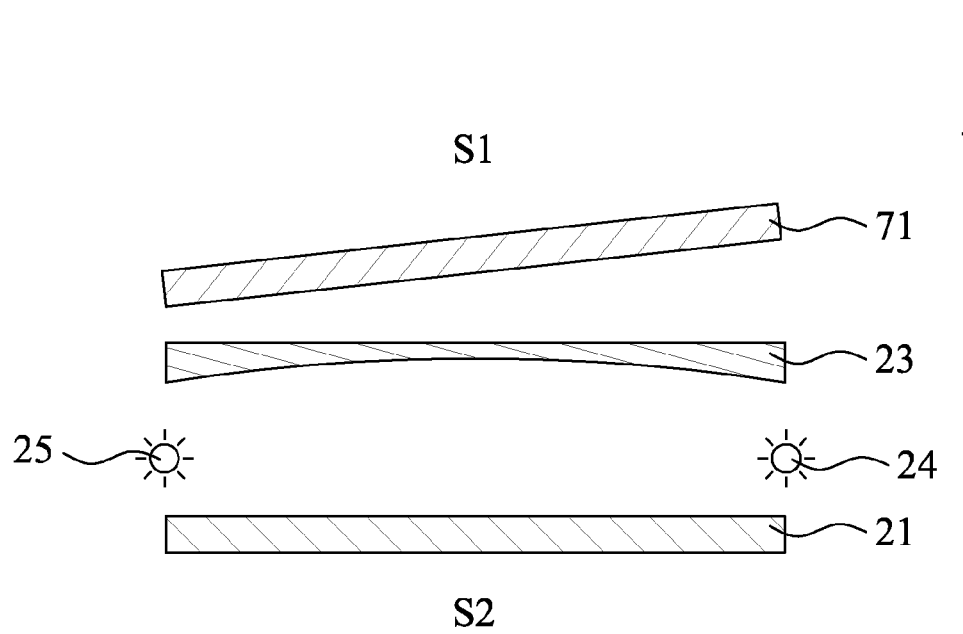
FIG. 7 shows a schematic view of a vehicle composite reflection and refraction multi-imaging device according to a fifth embodiment of the present invention.

Referring to FIG. 7, it shows a schematic view of a vehicle composite reflection and refraction multi-imaging device according to a fifth embodiment of the present invention. Differences between a vehicle composite reflection and refraction multi-imaging device 70 according to the fifth embodiment of the present invention and the vehicle composite reflection and refraction multi-imaging device 20 according to the first embodiment are as follows. Corresponding to the reflecting surface 21, a semi-reflecting surface 71 is disposed in an inclined manner. In this embodiment, the semi-reflecting surface 71 is inclined in a right-high-left-low manner, and in other embodiments can be inclined in other manners such as a right-low-left-high manner. Similarly, the vehicle composite reflection and refraction multi-imaging device 70 according to the fifth embodiment of the present invention has the aforementioned composite reflection and refraction effect.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

What is claimed is:

1. A vehicle composite reflection and refraction multi-imaging device comprising:
    a reflecting surface, facing a viewing side;
    a semi-reflecting surface, facing the reflecting surface, wherein at least one image of at least one light source is reflected by the semi-reflecting surface to form at least one mirror image on a mirror image side of the semi-reflecting surface, the at least one mirror image is then reflected by the reflecting surface to form at least one visible mirror image on a mirror image side of the reflecting surface, each visible mirror image undergoes the reflecting repeatedly to produce a plurality of visible mirror images; and
    a concave lens, disposed at the viewing side:
    wherein a viewer at the viewing side views a plurality of visible mirror images at the mirror image side of the reflecting surface through the refracting of the concave lens; and
    wherein the concave lens is disposed between the semi-reflecting surface and the reflecting surface.

2. The vehicle composite reflection and refraction multi-imaging device according to claim 1, wherein the reflecting surface has a vertical axis, which is perpendicular to the reflecting surface, the viewer at the viewing side views the visible mirror images at the mirror image side of the reflecting surface, and the visible mirror images of the at least one light source shrink gradually towards a direction of the vertical axis.

3. The vehicle composite reflection and refraction multi-imaging device according to claim 1, wherein corresponding to the reflecting surface, the semi-reflecting surface is disposed in an inclined manner.

4. The vehicle composite reflection and refraction multi-imaging device according to claim 1, wherein the reflecting surface is a flat reflecting surface.

5. The vehicle composite reflection and refraction multi-imaging device according to claim 1, wherein the semi-reflecting surface is a flat semi-reflecting surface.

6. The vehicle composite reflection and refraction multi-imaging device according to claim 1, wherein the concave lens has a first surface and a second surface, the first surface is a flat surface, the second surface is a concave surface, the first surface contacts the semi-reflecting surface, and there is a distance between the second surface and the reflecting surface.

7. The vehicle composite reflection and refraction multi-imaging device according to claim 1, wherein the concave lens has a first surface and a second surface, the first surface is a flat surface, the second surface is a concave surface, the first surface is disposed at the reflecting surface, and there is a distance between the second surface and the semi-reflecting surface.

8. The vehicle composite reflection and refraction multi-imaging device according to claim 1, wherein the at least one light source is disposed between the concave lens and the reflecting surface.

9. The vehicle composite reflection and refraction multi-imaging device according to claim 1, wherein the at least one light source is disposed behind a periphery of the reflecting surface.

10. The vehicle composite reflection and refraction multi-imaging device according to claim 1, wherein a periphery of the reflecting surface comprises at least one hole to receive at least one light source.

* * * * *